(12) United States Patent
Gurt Santanach et al.

(10) Patent No.: US 11,479,873 B2
(45) Date of Patent: Oct. 25, 2022

(54) METHOD FOR PRODUCING A THERMAL BARRIER ON A PART OF A TURBOMACHINE

(71) Applicant: SAFRAN HELICOPTER ENGINES, Bordes (FR)

(72) Inventors: Julien Gurt Santanach, Moissy-Cramayel (FR); Yann Danis, Moissy-Cramayel (FR); Fabrice Crabos, Moissy-Cramayel (FR)

(73) Assignee: SAFRAN HELICOPTER ENGINES, Bordes (FR)

(*) Notice: Subject to any disclaimer, the term of this patent is extended or adjusted under 35 U.S.C. 154(b) by 115 days.

(21) Appl. No.: 16/765,657

(22) PCT Filed: Nov. 20, 2018

(86) PCT No.: PCT/FR2018/052929
§ 371 (c)(1),
(2) Date: May 20, 2020

(87) PCT Pub. No.: WO2019/102137
PCT Pub. Date: May 31, 2019

(65) Prior Publication Data
US 2020/0299853 A1 Sep. 24, 2020

(30) Foreign Application Priority Data
Nov. 21, 2017 (FR) ...................... 1760968

(51) Int. Cl.
*B23P 15/00* (2006.01)
*F01D 5/28* (2006.01)
(Continued)

(52) U.S. Cl.
CPC ............ *C25D 13/02* (2013.01); *B23P 15/008* (2013.01); *B33Y 80/00* (2014.12); *C25D 13/12* (2013.01);
(Continued)

(58) Field of Classification Search
CPC ............... B23P 15/008; Y10T 29/4932; Y10T 29/49982
See application file for complete search history.

(56) References Cited

U.S. PATENT DOCUMENTS 5,234,636 A  8/1993 Hull et al.
5,302,319 A * 4/1994 Wright ............ C04B 35/62897
                                                            501/12
(Continued)

FOREIGN PATENT DOCUMENTS

CN  104562154 A  4/2015
CN  106414813 A  2/2017
(Continued)

OTHER PUBLICATIONS

International Search Report as issued in International Patent Application No. PCT/FR2018/052929, dated Mar. 13, 2019.
(Continued)

*Primary Examiner* — Sarang Afzali
(74) *Attorney, Agent, or Firm* — Pillsbury Winthrop Shaw Pittman LLP (57) ABSTRACT

A process for manufacturing a turbomachine part coated with a thermal barrier, includes manufacturing the part by additive manufacture; electrophoretic depositing the part of a layer including particles of a ceramic material; consolidating the layer by heat treatment to obtain a ceramic coating.

10 Claims, 5 Drawing Sheets

(51) Int. Cl.
*C25D 13/02* (2006.01)
*B33Y 80/00* (2015.01)
*C25D 13/12* (2006.01)
*F01D 9/04* (2006.01)

(52) U.S. Cl.
CPC .............. *F01D 5/288* (2013.01); *F01D 9/041* (2013.01); *F01D 5/284* (2013.01); *F05D 2230/31* (2013.01); *F05D 2230/90* (2013.01); *F05D 2240/12* (2013.01); *Y10T 29/4932* (2015.01); *Y10T 29/49982* (2015.01)

(56) References Cited

U.S. PATENT DOCUMENTS

| | | | |
|---|---|---|---|
| 6,294,261 B1* | 9/2001 | Sangeeta | C23C 10/18 |
| | | | 416/241 B |
| 8,668,442 B2* | 3/2014 | Morris | B33Y 80/00 |
| | | | 415/209.3 |
| 9,238,595 B2* | 1/2016 | Bouillon | F01D 5/288 |
| 9,664,052 B2* | 5/2017 | Delvaux | F01D 5/282 |
| 9,840,914 B2* | 12/2017 | Malie | C25D 13/20 |
| 9,845,703 B2* | 12/2017 | Baummer | F01D 25/002 |
| 10,794,197 B2* | 10/2020 | Margolies | F01D 5/288 |
| 2012/0003086 A1 | 1/2012 | Morris et al. | |
| 2016/0002790 A1 | 1/2016 | Whitaker et al. | |
| 2016/0052057 A1 | 2/2016 | Xu | |
| 2016/0160374 A1* | 6/2016 | Antolino | C25D 13/12 |
| | | | 428/448 |
| 2017/0247787 A1* | 8/2017 | Saha | C23C 12/00 |

FOREIGN PATENT DOCUMENTS

| | | |
|---|---|---|
| EP | 2 000 557 A1 | 12/2008 |
| FR | 2 939 430 A1 | 6/2010 |
| WO | WO 2015/114227 A1 | 8/2015 |

OTHER PUBLICATIONS

First Office Action as issued in Chinese Patent Application No. 201880075129.5, dated Aug. 25, 2022.

* cited by examiner

METHOD FOR PRODUCING A THERMAL BARRIER ON A PART OF A TURBOMACHINE

CROSS-REFERENCE TO RELATED APPLICATIONS

This application is the U.S. National Stage of PCT/FR2018/052929, filed Nov. 20, 2018, which in turn claims priority to French patent application number 1760968 filed Nov. 21, 2017. The content of these applications are incorporated herein by reference in their entireties.

BACKGROUND OF THE INVENTION

The present invention relates to the general field of turbomachines, and in particular to turbomachines for aircraft.

A turbomachine comprises parts which need to be cooled during operation of the turbomachine, typically because said parts are located in an area of the turbomachine whose temperature is above the limit temperature of use of said parts.

Distributors, or stationary blades, are typically parts of the turbomachine that need to be cooled during operation of the turbomachine, especially turbine distributors which are located downstream of the combustion chamber.

In the case of a dual-flow turbomachine, in order to cool the desired parts, part of the secondary flow, i.e. the air flow bypassing the combustion chamber, is taken off to be directed towards said parts so as to cool them.

In order to limit the quantity of air taken from the secondary flow, and thus improve the efficiency of the turbomachine, the shape of the parts is modified to improve the cooling of said parts.

However, the most efficient shapes are complex shapes that cannot be obtained with conventional manufacturing processes such as casting.

Currently, parts with complex shapes are manufactured using additive manufacturing techniques, also called three-dimensional (3D) printing, such as laser powder bed melting or electron beam powder bed melting processes.

Additive manufacturing makes it possible, for example, to manufacture turbine air distributors which consist of an inner disc, blades and outer disc in one piece.

However, such additive manufacturing techniques encounter a surface state problem, the surface of the parts has too much roughness (typically an $R_{max}$ of up to 100 μm).

In particular, excessive roughness is incompatible with the aerodynamic constraints that the parts located in the air flow of the turbomachine, such as the distributors, must respect.

Thus, there is a need for the manufacture of a turbomachine part with both a complex shape, in order to optimize its cooling, and a sufficiently smooth surface state, in order to respect aerodynamic constraints.

Furthermore, in order to increase the temperature limit of use of the parts of the turbomachine, for example the air distributors, it is known to apply on the desired parts of the parts a coating of a refractory material, typically of the yttriated zirconia type, in order to form a thermal barrier.

Currently, it is known to deposit a refractory lining to form a thermal barrier by thermal spraying, or by electron beam-physical vapor deposition (EB-PVD).

However, such techniques for depositing the refractory lining may encounter a surface state problem by forming a lining with excessive roughness.

Such a surface state problem appears in particular when the part on which said coating is deposited has a significant roughness.

Thus, there is a need for the manufacture of a part with a refractory lining forming a thermal barrier with a sufficiently smooth surface state.

SUBJECT MATTER AND SUMMARY OF THE INVENTION

The main purpose of the present invention is therefore to compensate for such disadvantages by proposing a process for manufacturing a turbomachine part coated with a thermal barrier comprising the following steps:
- manufacture of the part by additive manufacturing;
- electrophoretic deposition on the part of a layer comprising particles of a ceramic material;
- consolidation of the layer by heat treatment to obtain a ceramic coating.

Such a process makes it possible to obtain a component of complex shape by using additive manufacture, which is coated with a coating of ceramic material forming a thermal barrier, this ceramic coating making it possible to smooth the surface of the component by using an electrophoretic deposition of a layer comprising particles of the ceramic material.

Indeed, the applicant realized that the deposition of a ceramic coating by electrophoresis makes it possible to smooth the surface defects present on the part, these defects being due to the use of additive manufacturing.

Such a solution is also very advantageous for parts made of nickel-based superalloys, as the superalloys are difficult to machine, making recovery of the surface state by machining more complex.

The process can also include the following features which can be taken alone or in combination with each other technical possibilities:
- the layer comprises a sol-gel precursor monomer of the ceramic material, the process further comprising a step of polymerizing the monomer to form said ceramic material.
- the process further comprises a step of depositing a bond coat on the part, the layer being deposited on said bond coat.
- the bond coat comprises MCrAlYRE, with RE denoting Hf, and/or Si, and/or Ta, and/or Re, and/or Pt, and/or Pd, and with M denoting Ni and/or Co, or wherein the bond coat comprises aluminide modified with Pt, and/or Hf, and/or Si.
- the heat treatment of the part to consolidate a ceramic coating is carried out by heating the part to a temperature above 700° C., and preferably between 900° C. and 1100° C.;
- the ceramic material comprises $Y_2O_3$, $Al_2O_3$, $TiO_2$, $CeO_2$, and/or stabilized or partially stabilized zirconia of the type $ZrO_2$-$REO_{1.5}$ and/or $RE_2Zr_2O_7$ (where RE denotes one or more rare earth elements, for example Y, Ce, Gd, Sm, Yb, Dy or Er), and/or yttriated zirconia;
- the ceramic coating has a thickness between 10 μm and 300 μm, preferably between 50 μm and 150 μm;
- the part is a turbine air distributor comprising a plurality of blades, the ceramic coating being deposited on the blades.

According to another aspect, the invention provides a turbomachine part coated with a thermal barrier obtained by the manufacturing process according to any of the above features, said part comprising an inner part covered by the ceramic coating and which comprises an outer surface with a first roughness, the ceramic coating comprising an outer surface with a second roughness which is less than the first roughness.

As an additional feature, the part is a turbine air distributor comprising a plurality of blades, the ceramic coating being located on the blades.

BRIEF DESCRIPTION OF THE DRAWINGS

Other features and advantages of the present invention will be apparent from the description given below, with reference to the appended drawings which illustrate a non-limiting example embodiment. In the figures.

DETAILED DESCRIPTION OF THE INVENTION

Figure 1:
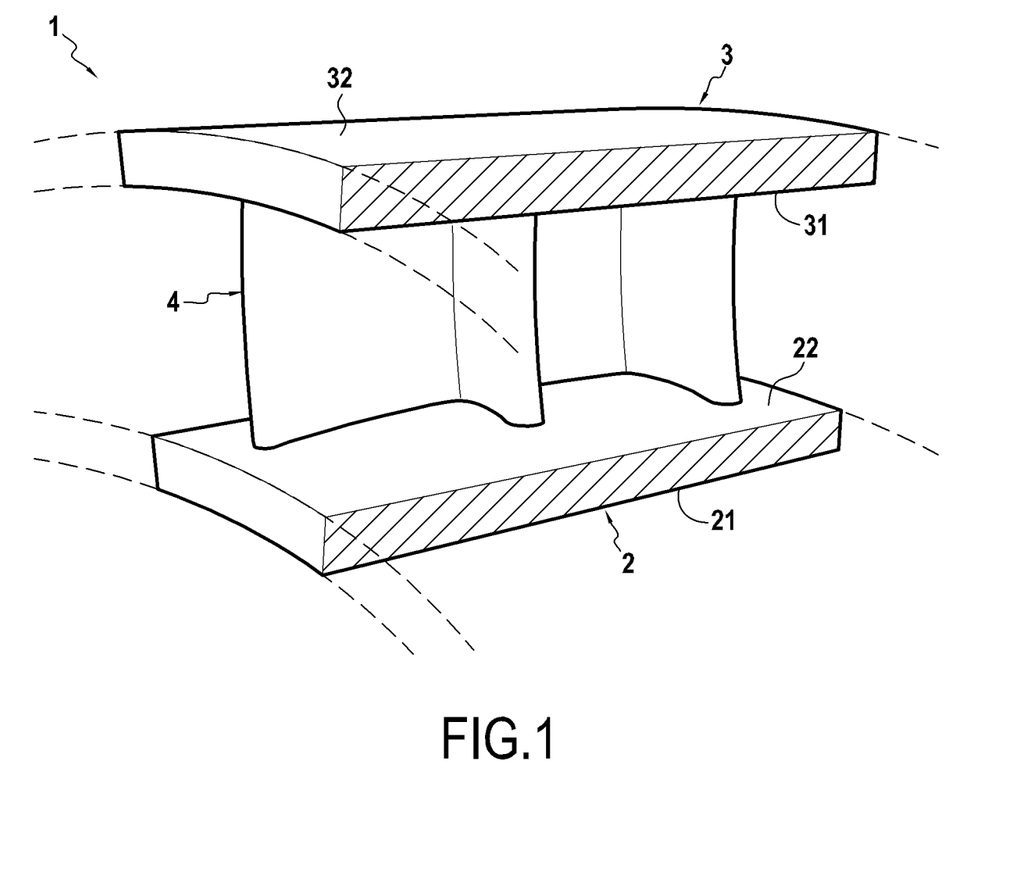
FIG. 1 represents an air distributor according to an embodiment of the invention.

FIG. 1 shows an air distributor 1 of a turbine of a turbomachine. However, although the invention is particularly applicable to air distributors, it is not limited to air distributors but can be applied to other parts of the turbomachine requiring a thermal barrier.

For simplification purposes, only a portion of the air distributor 1 is shown in FIG. 1.

The air distributor 1 consists of an inner ring 2, an outer ring 3, and blades 4 which connect the inner ring 2 to the outer ring 3.

The inner ring 2 comprises an inner side 21 which is directed towards the inside of the turbomachine and an outer side 22 which is directed towards the outside of said turbomachine, and therefore towards the outer ring 3.

The outer ring 3 comprises an inner side 31 which is directed towards the inside of the turbomachine, i.e. towards the inner ring 2, and an outer side 32 which is directed towards the outside of the turbomachine.

The outer side 22 of the inner ring 2 and the inner side 31 of the outer ring 3 delimit an air flow of the turbomachine.

The blades 4 are intended to be in the air flow of the turbomachine and therefore connect the outer side 22 of the inner ring 2 and the inner side 31 of the outer ring 3.

Figure 5:
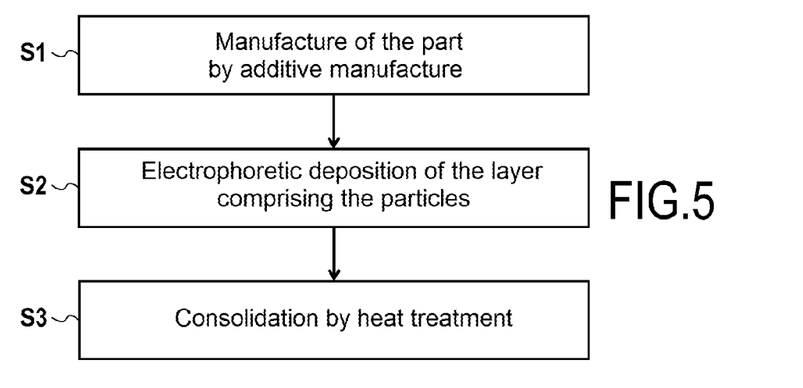
FIG. 5 schematically represents the various steps of a manufacturing process according to a possible implementation of the invention.

As shown in FIG. 5, the manufacturing process includes a step S1 in which the air distributor 1 is obtained by additive manufacturing. The inner ring 2, the outer ring 3 and the blades 4 are made in one piece.

In addition, the air distributor 1 being obtained by additive manufacture, said air distributor 1 comprises a high roughness on its outer surface, typically an $R_{max}$ greater than 50 µm. $R_{max}$ is understood here to mean the maximum profile height as defined in the standard EN ISO 4288.

The air distributor 1 can for example be realized by laser powder bed fusion or by electron beam powder bed fusion.

The air distributor 1 consists of a ceramic coating 5 applied to the outer side 22 of the inner ring 2, the blades 4 and the inner side 31 of the outer ring 3. The part of the air distributor 1 delimiting the air flow of the turbomachine is thus covered by the ceramic coating 5 and is protected against the very high temperatures caused by the circulation of hot air in the air flow. However, the ceramic coating 5 may be deposited only on certain elements delimiting the air flow, in particular the ceramic coating may be deposited only on the blades 4.

The air distributor 1 therefore consists of a metallic inner part 6, typically made of a nickel- or cobalt-based alloy, which is covered by the ceramic coating 5 that forms a thermal barrier.

The ceramic material of the ceramic coating 5 can be yttria-stabilized zirconia (YSZ), zirconium oxide. The ceramic material can also be stabilized or partially stabilized zirconia of the type $ZrO_2$—$ReO_{1.5}$ and/or $RE_2Zr_2O_7$ (where Re denotes one or more rare earth elements, for example Y, Ce, Gd, Sm Yb, Dy or Er). The ceramic material can also be $Y_2O_3$, $Al_2O_3$, $TiO_2$ or $CeO_2$. The ceramic material can also be a mixture of these components. However, other materials can be used, depending on the temperature and time resistance characteristics which are to be given to the ceramic coating 5.

Figure 2A:
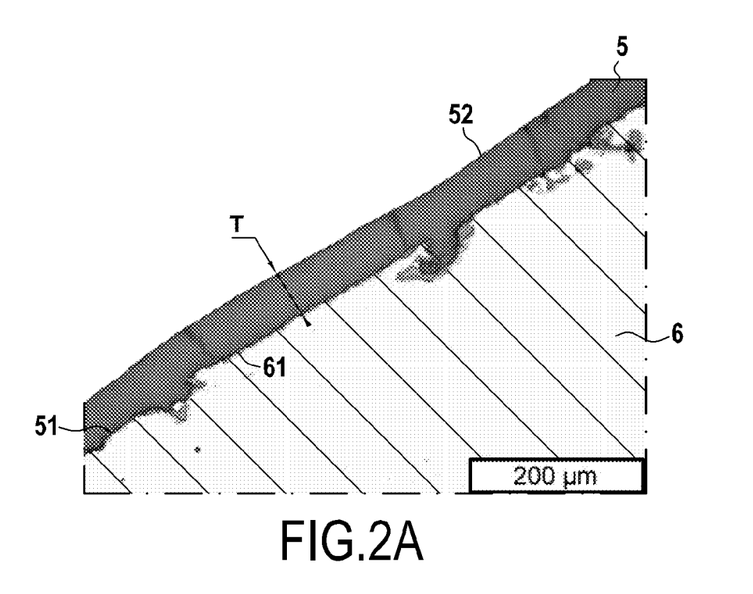
FIG. 2A and FIG. 2B represent sectional views of parts coated with a thermal barrier according to the invention.
Figure 2B:
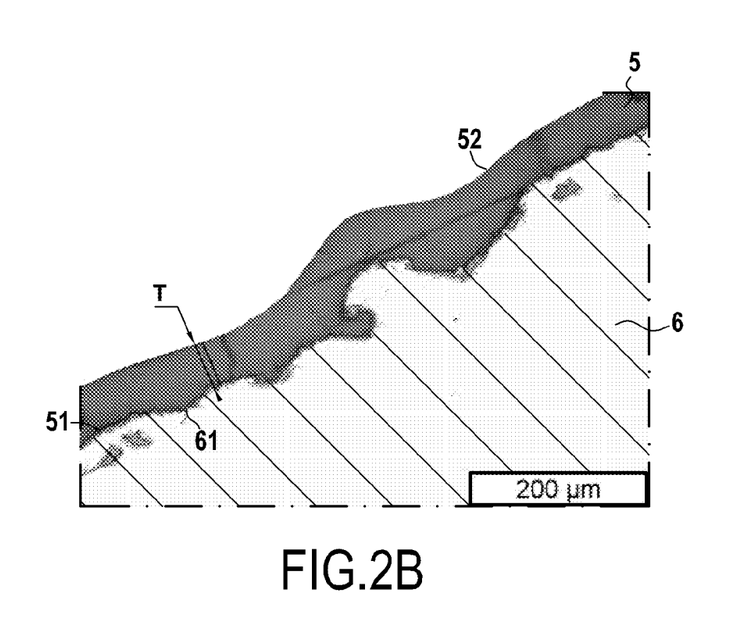

Moreover, the ceramic coating 5, in addition to having a thermal protective effect for the air distributor 1, has a smoothing effect to reduce the roughness of the air distributor 1, as shown in FIGS. 2A and 2B.

In addition, the high roughness of the inner part 6, the inner part 6 being obtained by additive manufacture, improves the adhesion of the ceramic coating 5 to said inner part 6.

The inner part 6 of the air distributor 1 comprises an outer surface 61, and the ceramic coating 5 comprises an inner surface 51 in contact with the outer surface 61 of the inner part 6 of the air distributor 1 and an outer surface 52 opposite to the inner surface 51.

The thickness T of the ceramic coating 5 can vary according to requirements, but in order to resist temperatures above 1000° C. is preferably between 10 µm and 300 µm, and even more preferably between 50 µm and 150 µm. In addition, a ceramic coating thickness of more than 50 µm ensures a good smoothing effect of the air distributor 1.

As can be seen in FIGS. 2A and 2B, the outer surface 61 of the inner part 6 has a first roughness while the outer surface 52 of the ceramic coating 5 (which corresponds to the outer surface of the air distributor 1) has a second roughness which is less than the first roughness. Typically, the outer surface 61 of the inner part 6 has an $R_{max}$ greater than or equal to 50 µm (first roughness), and the outer surface 52 of the ceramic coating 5 has an $R_{max}$ less than or equal to 20 µm (second roughness). Preferably, the outer surface 52 of the ceramic coating 5 has an $R_{max}$ less than or equal to 10 µm.

The ceramic coating has a different roughness on its two surfaces. The inner surface 51 of the ceramic coating 5 has a roughness equal to that of the outer surface 61 of the inner part 6, whereby the roughness of the inner surface 51 of the ceramic coating is greater than the roughness of the outer surface 52 of said ceramic coating 5.

Such a difference in roughness between the metallic inner part 6 and the ceramic coating 5 is achieved by electrophoretic deposition of the ceramic coating 5 on the inner part 6. The applicant has indeed noticed that the electrophoretic deposition of the ceramic coating 5 makes it possible to smooth the part on which said ceramic coating 5 is deposited. Indeed, the applicant noticed that the particles 71 tend to accumulate in the hollows of the outer surface 61 of the inner part 6.

Figure 3:
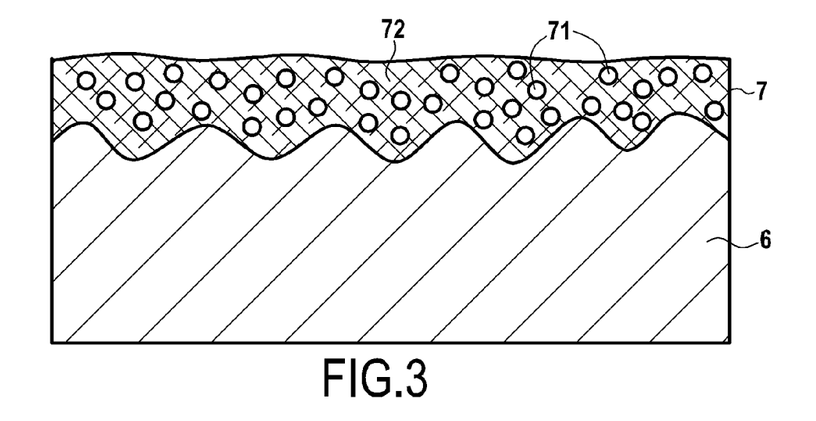
FIG. 3 schematically shows the electrophoretically deposited layer on the part.

Electrophoretic deposition is carried out by depositing a layer 7 comprising particles 71 of the ceramic material in a step S2 of the manufacturing process, as shown in FIGS. 3 and 5.

Furthermore, in a possible embodiment, the electrophoretically deposited layer 7 also includes a sol-gel precursor monomer 72 of said ceramic material, as shown in FIG. 3. The monomer 72 can for example be a zirconium protoxide ($Zr(OC_3H_7)$).

This embodiment allows a better smoothing effect to be obtained by creating the ceramic coating 5.

The layer 7 thus deposited being liquid, because the particles 71 of the ceramic material are dispersed in the sol-gel precursor monomer 72 of said ceramic material which is liquid, the layer 7 tends to have a smooth outer side 7a in order to reduce its surface tension.

Figure 4:
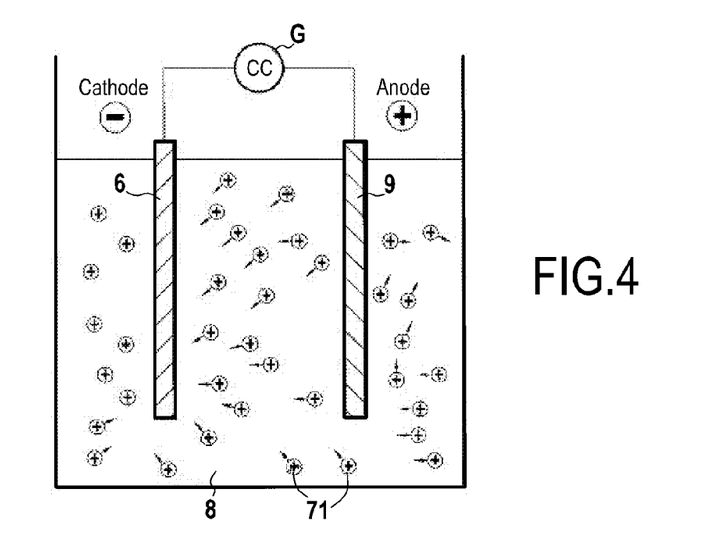
FIG. 4 schematically shows the deposition of a ceramic coating by electrophoresis on a turbomachine part.

This layer 7 is deposited by electrophoresis as shown in FIG. 4. The inner part 6 is placed in an electrolyte 8 formed from a liquid comprising a carrier liquid, said carrier liquid may for example be of aqueous or alcoholic type, and the particles 71 of the ceramic material which are dispersed in this carrier liquid. The inner part 6 is made of electrically conductive material.

The electrolyte 8 may also include the monomer 72 if it is desired that the layer 7 includes the monomer 72.

In order to deposit the layer 7, a generator G imposes a voltage difference between the inner part 6 and a counter-electrode 9. The generator G is either direct current or pulsed current. The inner part 6 is polarized at a charge opposite to that of the particles 71. Due to the application of an electric field between the inner part 6 and the counter-electrode 9, the particles 71 move and deposit on the inner part 6 to form the layer 7.

If the monomer 72 is present in the electrolyte 8, the monomer 72 is thus deposited together with the particles 71 to form the layer 7 with said particles 71.

The generator applies a voltage that is higher than 1 V, preferably higher than 40 V. The treatment time for the deposition of layer 7 is more than 1 minute, and preferably more than 5 minutes for the homogeneity of layer 7. The treatment time and the voltage applied by the generator are adapted according to the desired thickness T for the ceramic coating 5 (and thus the layer 7).

As shown in FIG. 5, after the step S2 of electrophoretic deposition of the layer 7 comprising the particles 71 of the ceramic material, a step S3 of consolidation of the layer 7 by heat treatment is carried out, so as to obtain the ceramic coating 5. The consolidation heat treatment may for example be carried out in the open air or in a controlled atmosphere at a temperature above 700° C., and preferably at a temperature of between 900° C. and 1100° C.

The process may also include a drying step prior to the step S3 of consolidating the layer 7 to remove the carrier liquid present in the layer 7. This drying step can be carried out with the layer 7 consolidation heat treatment.

Figure 6:
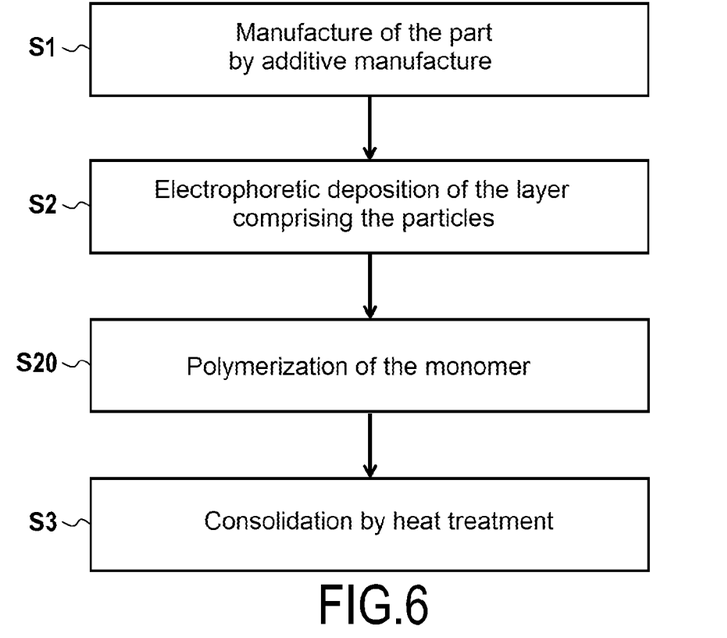
FIG. 6 schematically represents the different steps of the manufacturing process according to a possible variant of the process of the invention.

In addition, as shown in FIG. 6, when the layer comprises the monomer 72, the process includes a step S20 to polymerize the monomer 72. This polymerization step S20 changes the monomer 72 from a liquid state (sol) to a solid state (gel). This step also makes it possible, depending on the carrier liquid used, to remove said carrier liquid from the layer 7. This polymerization step S20 can, for example, be carried out by heat treatment at a temperature of 200° C. Following this polymerization step S20, the layer 7 comprises only the composite material and forms the composite coating 5.

Figure 7:
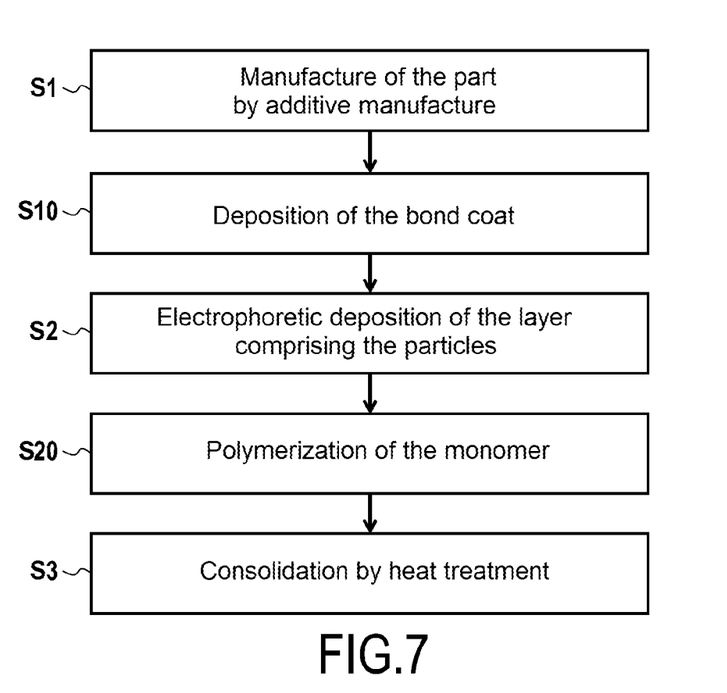
FIG. 7 schematically represents the different steps of the manufacturing process according to a possible variant of the process of the invention

In a possible variant, illustrated in FIG. 7, a bond coat is deposited on the inner part 6 prior to the deposition of the layer 7 in a step S10.

This bond coat can for example be deposited by electrophoresis, electrodeposition, painting, vapor deposition, thermal spraying or sol-gel.

Thus, at the end of manufacture, the air distributor 1 comprises its inner part 6 which is covered by the bond coat, said bond coat itself being covered by the ceramic coating 5.

The deposition of a bond coat improves adhesion between the ceramic coating 5 and the inner part 6 of the air distributor 1.

In addition, this bond coat improves the protection of the inner part 6 of the air distributor 1 against corrosion and/or oxidation at high temperatures. In addition, when the bond coat is electrophoretically deposited, the bond coat also reduces the roughness of the surface on which the ceramic coating 5 is deposited, thereby further reducing the roughness of the outer surface 52 of the ceramic coating 5.

Preferentially, the bond coat comprises MCrAlYRE, with RE denoting Hf (hafnium), and/or Si (silicon), and/or Ta (tantalum), and/or Re (rhenium), and/or Pt (platinum), and/or Pd (palladium), and with M denoting Ni (nickel) and/or Co (cobalt), or the bond coat comprises aluminide modified with Pt, and/or Hf, and/or Si.

A heat treatment can be carried out afterwards in order to consolidate or diffuse this bond coat.

Furthermore, the polymerization of monomer 72 and the consolidation heat treatment of the ceramic coating 5 can be carried out in the same heat treatment step. Thus, at the beginning of the heat treatment the monomer 72 is polymerized, then the ceramic coating 5 is consolidated by continuing the heat treatment.

The invention thus makes it possible to form a part for a turbomachine which is coated with a thermal barrier whose surface state is acceptable to meet the aerodynamic criteria, particularly for a part located in the air flow of the turbomachine, despite the fact that initially the part has a degraded surface state with excessive roughness.

Figure 8:
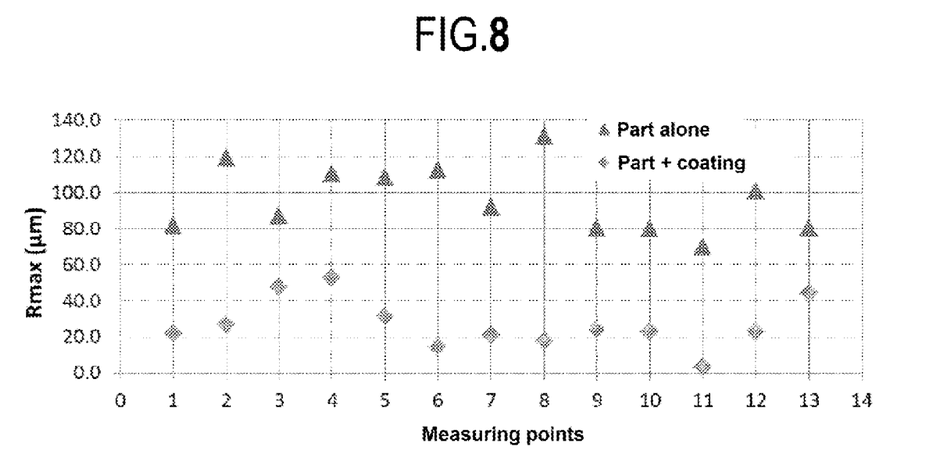
FIG. 8 is a graph representing the decrease in roughness at different points of a part manufactured by additive manufacturing due to the electrophoretic deposition of a thermal barrier.

As shown in FIG. 8, the deposition of the ceramic coating 5 reduces the roughness of a part manufactured by additive manufacturing.

In order to obtain the graph in FIG. 8, a part was manufactured by additive manufacturing, and the roughness of said part manufactured by additive manufacturing was measured at different points distributed over said part. As shown in FIG. 8, the $R_{max}$ of the part at the different measuring points is greater than 60 μm, and may even be greater than 100 μm at several measuring points.

In the example in FIG. 8, the part is a distributor angular sector as shown in FIG. 1. The distributor angular sector was made from a nickel-based superalloy by selective laser melting (SLM).

In addition, in order to obtain the other half of the points on the graph in FIG. 8, a ceramic-coated thermal barrier was applied to the additive-manufactured part, and the roughness of the ceramic coating was measured at the same measuring points as for the part without a ceramic coating. As can be seen in FIG. 8, the $R_{max}$ is greatly reduced by the deposition of the ceramic coating.

In the example in FIG. 8, the ceramic coating is yttriated zirconia. The ceramic coating for the example in FIG. 8 is made by electrophoretic deposition of a suspension of yttriated zirconia. The electrophoretically deposited layer, in addition to comprising yttriated zirconia particles, comprises a sol-gel precursor of a ceramic material. The sol-gel precursor is liquid at the time of deposition and is then solidified by polymerization.

The invention makes it possible to dispense with the steps of surface treatment of the part, such as machining, which can be carried out to smooth the surface of the part.

The phrase "between . . . and . . . " should be understood to include the bounds.

The invention claimed is:

1. A process for manufacturing a turbomachine part coated with a thermal barrier, the process comprising:
   manufacturing the part by additive manufacturing;
   electrophoretic depositing on the part of a layer comprising particles of a ceramic material, the electrophoretic depositing comprising dispersing the particles of the ceramic material in a sol-gel precursor monomer of said ceramic material which is liquid and polymerizing said sol-gel precursor monomer of said ceramic material to form said ceramic material; and
   consolidating the layer by heat treatment in order to obtain a ceramic coating to form at least part of the thermal barrier, wherein a surface roughness of the ceramic coating is less than a surface roughness of an outer surface of the part on which the ceramic coating is formed.

2. The process according to claim 1, further comprising depositing a bond coat on the part, the layer being deposited on said bond coat.

3. The process according to claim 2, wherein the bond coat comprises MCrAlYRE, with RE denoting Hf, and/or Si, and/or Ta, and/or Re, and/or Pt, and/or Pd, and with M denoting Ni and/or Co, or wherein the bond coat comprises aluminide modified with Pt, and/or Hf, and/or Si.

4. The process according to claim 1, wherein the heat treatment of the part to consolidate the ceramic coating is carried out by heating the part to a temperature above 700° C.

5. The process according to claim 4, wherein the temperature is between 900° C. and 1100° C.

6. The process according to claim 1, wherein the ceramic coating has a thickness between 10 μm and 300 μm.

7. The process according to claim 6, wherein the thickness is between 50 μm and 150 μm.

8. The process according to claim 1, wherein the ceramic material comprises $Y_2O_3$, $Al_2O_3$, $TiO_2$, $CeO_2$, and/or stabilized or partially stabilized zirconia of the type $ZrO_2$-$REO_{1.5}$ and/or $RE_2Zr_2O_7$, with RE denoting one or more rare earth elements, and/or yttriated zirconia.

9. The process according to claim 1, wherein the part is a turbine air distributor comprising a plurality of blades, the ceramic coating being deposited on the blades.

10. The process according to claim 1, wherein a maximum profile height Rmax of the surface roughness of the outer surface of the part is greater than or equal to 50 μm and a maximum profile height Rmax of the surface roughness of the ceramic coating is less than or equal to 20 μm.

* * * * *